United States Patent
Kummer (10) Patent No.: US 10,465,754 B2
(45) Date of Patent: Nov. 5, 2019

(54) DUAL CLUTCH WITH COOLING DISTRIBUTION RESERVOIR CHAMBERS

(75) Inventor: Martin E. Kummer, Auburn, IN (US)

(73) Assignee: Eaton Cummins Automated Transmission Technologies LLC, Indianapolis, IN (US)

(*) Notice: Subject to any disclaimer, the term of this patent is extended or adjusted under 35 U.S.C. 154(b) by 2585 days.

(21) Appl. No.: 11/694,513

(22) Filed: Mar. 30, 2007

(65) Prior Publication Data

US 2008/0236978 A1 Oct. 2, 2008

(51) Int. Cl.
*F16D 25/12* (2006.01)
*F16D 25/0638* (2006.01)
*F16D 21/06* (2006.01)

(52) U.S. Cl.
CPC ......... *F16D 25/0638* (2013.01); *F16D 21/06* (2013.01); *F16D 25/123* (2013.01)

(58) Field of Classification Search
CPC ......... F16D 13/72; F16D 25/123; F16D 25/10
USPC ..... 192/70.12, 85.61, 113.34, 48.611, 85.25, 192/106 F
See application file for complete search history.

(56) References Cited

U.S. PATENT DOCUMENTS

| | | | |
|---|---|---|---|
| 2,687,198 A | 8/1954 | Greenlee | |
| 3,300,004 A | 1/1967 | Peterson | |
| 3,351,469 A | 11/1967 | McIndoe | |
| 3,749,217 A | 7/1973 | Bush et al. | |
| 3,811,657 A * | 5/1974 | Hoover | 254/367 |
| 3,823,802 A | 7/1974 | Winzeler et al. | |
| 4,027,758 A | 6/1977 | Gustavsson et al. | |
| 4,134,483 A | 1/1979 | Horsch | |
| 4,385,429 A | 5/1983 | Crankshaw | |
| 4,450,944 A | 5/1984 | Fujioka et al. | |
| 4,574,926 A | 3/1986 | Bubak | |
| 4,629,050 A | 12/1986 | Valier | |
| 4,667,796 A | 5/1987 | Uchibaba | |
| 4,828,089 A * | 5/1989 | Collins et al. | 192/70.12 |
| 4,971,184 A | 11/1990 | Lederman | |
| 5,232,418 A | 8/1993 | Aoki et al. | |
| 5,495,927 A | 3/1996 | Samie et al. | |

(Continued)

FOREIGN PATENT DOCUMENTS

| | | |
|---|---|---|
| EP | 1482195 | 12/2004 |
| WO | WO-2004/104439 | 12/2004 |

OTHER PUBLICATIONS

Haviland, M., "Clutch Surface Temperature Measurements in a Controlled-Coupling Automatic Transmission," SAE Technical Paper 620274, 1962, doi: 10.4271/620274.*

(Continued)

*Primary Examiner* — David J Hlavka
(74) *Attorney, Agent, or Firm* — Fishman Stewart PLLC (57) ABSTRACT

A clutch apparatus includes a clutch pack having a plurality of friction disks. The clutch pack will selectively transfer torque from a torque supplying member to a first torque receiving member. The apparatus also includes a first cooling fluid inlet. At least a portion of the fluid is supplied through the first cooling inlet to a first friction surface. The apparatus further includes a second cooling inlet. The fluid is supplied through the second cooling inlet to a second friction surface. The first cooling fluid inlet will selectively supply a greater volumetric flow of the fluid than the volumetric flow of the second cooling inlet.

16 Claims, 6 Drawing Sheets

(56) References Cited

U.S. PATENT DOCUMENTS

| | | | |
|---|---|---|---|
| 5,743,369 | A | 4/1998 | Lorriette |
| 6,202,814 | B1 | 3/2001 | Bradford, Jr. |
| 6,206,163 | B1 | 3/2001 | Schneider |
| 6,244,407 | B1 | 6/2001 | Kremer et al. |
| 6,464,059 | B1 | 10/2002 | Kundermann et al. |
| 6,523,657 | B1 | 2/2003 | Kundermann et al. |
| 6,543,597 | B2 | 4/2003 | Tanikawa |
| 6,615,966 | B2 | 9/2003 | Kato |
| 6,827,191 | B2 | 12/2004 | Kuhstrebe |
| 6,881,107 | B2 | 4/2005 | Roycroft |
| 6,907,973 | B2 | 6/2005 | Schiele et al. |
| 6,929,107 | B2 | 8/2005 | Hegerath |
| 6,968,935 | B2 | 11/2005 | Biermann et al. |
| 7,021,447 | B2 | 4/2006 | Duwel |
| 7,104,378 | B2 | 9/2006 | Martin |
| 7,114,605 | B2 | 10/2006 | Grosspietsch et al. |
| 7,121,392 | B2 | 10/2006 | Bradford et al. |
| 2002/0166746 | A1* | 11/2002 | Porter ............................ 192/31 |
| 2003/0155206 | A1* | 8/2003 | Arai et al. ................. 192/70.12 |
| 2004/0159523 | A1* | 8/2004 | Duan et al. ............. 192/85 CA |
| 2004/0178041 | A1* | 9/2004 | Kraxner et al. ........... 192/87.19 |
| 2004/0206599 | A1* | 10/2004 | Hegerath ................... 192/87.11 |
| 2006/0042904 | A1 | 3/2006 | DeMaziere |
| 2006/0042909 | A1 | 3/2006 | DeMaziere |
| 2006/0086586 | A1 | 4/2006 | Braford |
| 2006/0113157 | A1* | 6/2006 | Ichikawa et al. ........ 192/113.34 |
| 2006/0131122 | A1* | 6/2006 | Burns et al. ............... 192/70.12 |

OTHER PUBLICATIONS

English abstract for EP-1482195.
International Search Report for PCT/IB2008/000744.

* cited by examiner

DUAL CLUTCH WITH COOLING DISTRIBUTION RESERVOIR CHAMBERS

TECHNICAL FIELD

The disclosure relates to clutches for torque transmission.

BACKGROUND

Twin-clutch, twin-shaft, dual shaft, or dual clutch transmissions of the alternating shifting type are well known in the prior art. Various types of twin clutch transmissions have been proposed and put into practical use, particularly in the field of wheeled motor vehicles. Traditional twin clutch transmissions are of a type in which gears are parted into two groups, each group having an individual main clutch, so that the operative condition of each group of gears is carried out by selectively engaging a corresponding main clutch. Twin clutch transmissions are used in vehicles to improve the transition from one gear ratio to another and, in doing so, improve the efficiency of the transmission. The gears of each group are typically individually engaged so as to rotatably connect a transmission input shaft to a transmission output shaft for transmitting torque at differing ratios. The differing ratios may be engaged by multiple shift clutches.

In such transmissions, the main section may be shifted by means of a shift control system. Typical shift control systems include multiple actuators for engaging and disengaging the multiple shift clutches. The actuators may be pneumatic, electric, or hydraulic, and typically, one double acting actuator controls each shift clutch. The shift control system may also include a control logic for controlling the engagement of the main clutches, and the shift clutches to provide a desired gear ratio during vehicle operation. Generally, one ratio for each group may be simultaneously engaged with only one main clutch engaged during vehicle operation. To complete a shift in a dual clutch transmission, the engaged main clutch is disengaged as the disengaged main clutch is engaged. Accordingly, the disengaged group may be reconfigured as the engaged shift clutch is disengaged while another shift clutch of the group is engaged to provide a higher or low gear ratio to complete the next main clutch disengage/engage process.

A typical dual clutch is illustrated in commonly owned U.S. Pat. No. 7,082,850, to Hughes, the disclosure of which is hereby incorporated by reference in its entirety. Many main clutches include clutch packs, having a plurality of clutch disks, for engaging and disengaging each gear group with the engine. Cooling of these clutch packs have been limited to supplying a cooling oil to the clutch packs, to prevent overheating of the friction surfaces.

SUMMARY

An illustrative embodiment includes a clutch apparatus that includes a clutch pack having a plurality of friction disks. The clutch pack will selectively transfer torque from a torque supplying member to a first torque receiving member. The apparatus also includes a first cooling fluid inlet. At least a portion of the fluid is supplied through the first cooling inlet to a first friction surface. The apparatus further includes a second cooling inlet. The fluid is supplied through the second cooling inlet to a second friction surface. The first cooling fluid inlet will selectively supply a greater volumetric flow of the fluid than the volumetric flow of the second cooling inlet.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

DETAILED DESCRIPTION

Figure 1:
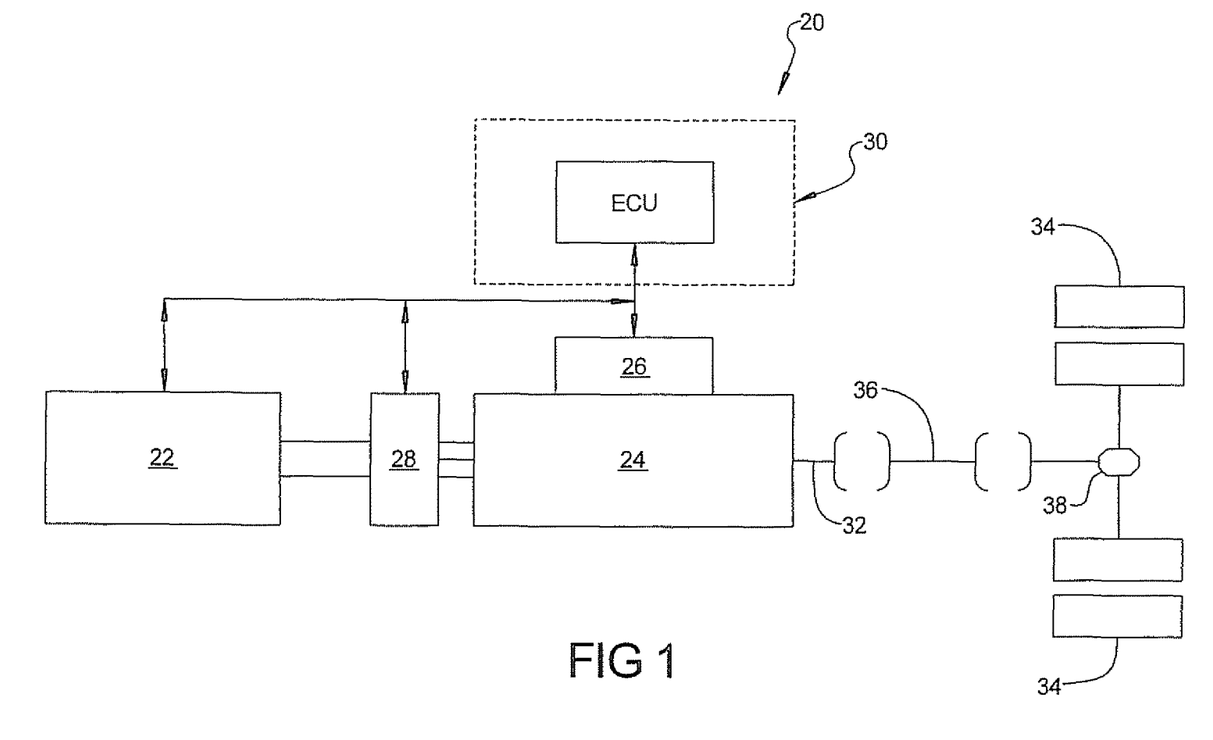
FIG. 1 is a schematic illustration of a vehicle according to an embodiment.

FIG. 1 illustrates a powertrain system 20 is shown in accordance with an embodiment. In the illustrated embodiment, the powertrain system 20 includes a prime mover 22, such as a spark-ignited or compression-ignited internal combustion engine, and a transmission 24. A shift control system 26 operates to engage and disengage gear ratios within the transmission 24, as discussed in greater detail below. A main clutch assembly 28 is positioned between the prime mover 22 and transmission 24 to selectively engage/disengage the prime mover 22 from transmission 24.

In an embodiment, powertrain system 20 also includes an electronic control unit (ECU) 30 for controlling operation of the prime mover 22, main clutch assembly 28, and transmission 24. In an implementation of the invention, ECU 30 may include a programmable digital computer that is configured to receive various input signals, including without limitation, the operating speed of the prime mover 22, transmission input speed, selected transmission ratio, transmission output speed and vehicle speed, and processes these signals accordingly to logic rules to control operation of powertrain system 20. For example, ECU 30 may be programmed to deliver fuel to the prime mover 22 when the prime mover 22 functions as an internal combustion engine. To support this control, each of the prime mover 22, and main clutch assembly 28 may include its own control system (not shown) contained within ECU 30. However, it will be appreciated that the present invention is not limited to any particular type or configuration of ECU 30, or to any specific control logic for governing operation of powertrain system 20.

In the embodiment shown in FIG. 1, a transmission output rotation from an output shaft, or output member, 32 is distributed to wheels 34 through a drive shaft 36 and a differential 38.

Figure 2:
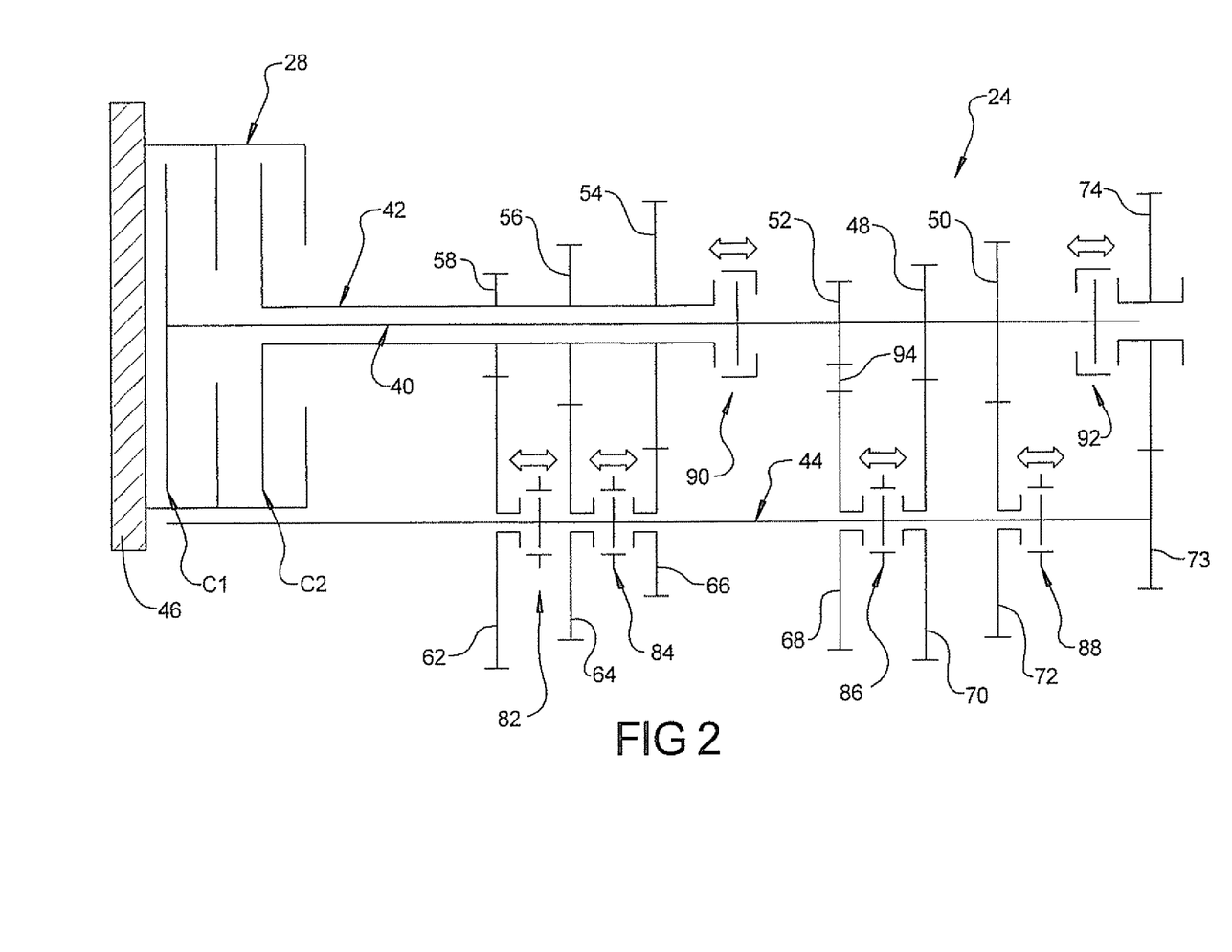
FIG. 2 is a schematic illustration of a transmission and twin clutch arrangement according to an embodiment.

Referring to FIG. 2, an embodiment of a transmission and clutch arrangement for use in the powertrain system 20 is shown, although other types of In the illustrated embodiment, transmission 24 includes a first input shaft 40, a second input shaft 42, a countershaft 44 that extends substantially parallel with first and second input shafts 40 and 42, and a plurality of gears which are arranged on and/or around shafts 40, 42 and 44. Although shafts 40, 42 and 44 are illustrated as being mounted in a common plane in FIG. 2, these shafts may be arranged in different planes.

In the embodiment shown in FIG. 2, first input shaft 40 is connectable to an output member 46 of the prime mover 22, such as a flywheel, through a first main clutch C1 that is used to establish even speed gearing (viz., second speed gearing, fourth speed gearing and reverse gearing), while second input shaft 42 is connectable to flywheel 46 through a second main clutch C2 that is used for establishing odd speed gearing (viz., first speed gearing, third speed gearing and fifth speed gearing). In an embodiment of the invention, first and second main clutches C1 and C2 are of a normally OFF type, which assumes the OFF (viz., disengaged) state due to a biasing force of a spring and the like under a normal condition and establishes the ON (viz., engaged) state due to work of a hydraulic or electric actuator upon receiving a given instruction. Engagement and disengagement of first and second main clutches C1, C2 may function automatically under the control of ECU 30, and without intervention of a vehicle driver, when powertrain systems operates like an "automatic" transmission.

To first input shaft 40 there are connected a 2nd speed input gear 48, a 4th speed input gear 50 and a reverse input gear 52, such that gears 48, 50 and 52 rotate together with first input shaft 40. Similarly, to second input shaft 42 there are connected a 5th speed input gear 54, a 3rd speed input gear 56 and a 1st speed input gear 58, such that gears 54, 56 and 58 rotate together with second input shaft 42. The number of input gears provided on first and second input shafts is not limited to the number schematically illustrated in FIG. 2, and may include more or less input gears depending on the number of ratios desired in the transmission. The term "gear," as stated herein, is used to define the toothed wheels schematically illustrated in FIG. 2, as well as manufacturing the toothed features of the wheels directly into first and second input shafts 40, 42 and countershaft 44.

To countershaft 44 there are rotatably connected a 1st speed output gear 62, a 3rd speed output gear 64, a 5th speed output gear 66, a reverse output gear 68, a 2nd speed output gear 70 and a 4th speed output gear 72. Thus, output gears 62-72 rotate around countershaft 44. Like input gears 48-58, the number of output gears provided on countershaft 44 is not limited to the number shown in FIG. 2.

Referring still to FIG. 2, 1st speed output gear 62, 3rd speed output gear 64 and 5th speed output gear 66 are meshed with 1st speed input gear 58, 3rd speed input gear 56 and 5th speed input gear 54, respectively. Similarly, reverse output gear 68, 2nd speed output gear 70, and 4th speed output gear 72 are meshed with reverse input gear 52 (through idler 94), 2nd speed input gear 48, and 4th speed input gear 50, respectively. In another embodiment, transmission 24 may include a second countershaft (not shown) that includes one or more of the output gears rotatably disposed on first countershaft 44.

To countershaft 44 there is also integrally connected a final drive pinion gear 73 that rotates together with countershaft 44. Final drive pinion 73 is arranged perpendicular to an axis of a rotational output member 74, such as a final drive ring gear, and is meshed with output member 74. In the embodiment shown in FIG. 1, a transmission output rotation from drive pinion 73 to output member 74 is distributed to wheels 34 through a drive shaft 36 and a differential 38.

Referring again to FIG. 2, transmission 24 also includes axially moveable clutches 82, 84, 86 and 88, such as synchronized single or double acting dog-type clutches, which are splined to countershaft 44 for rotation therewith. Clutch 82 is moveable by a conventional shift fork (not shown) in an axial direction toward main clutch assembly 28 to fix countershaft 44 for rotation with 1st speed output gear 62. Similarly, clutch 84 may be moved in opposite axial directions to rotationally fix output gear 64 or output gear 66 to countershaft 44. Clutch 86 may be selectively moved in opposite axial directions to rotationally fix output gear 68 or output gear 70 to countershaft 44. Clutch 88 may be moved in an axial direction toward main clutch assembly 28 to fix countershaft 44 for rotation with output gear 72. In another embodiment of the invention, clutches 82, 84, 86 and 88 may also be provided on first and second input shafts 40, 42 to engage and disengage gears rotatably supported on input shafts 40, 42 in a manner substantially similar to the manner in which the gears are engaged on countershaft 44.

In an embodiment of the invention, transmission 24 also includes axially moveable input shaft clutches 90 and 92, such as synchronized single acting dog-type clutches, which are splined to first input shaft 40 for rotation therewith. In the illustrated embodiment, clutch 90 may be moved in an axial direction toward main clutch assembly 28 to fix first input shaft 40 for rotation with second input shaft 42. Similarly, clutch 92 may be moved in an axial direction away from main clutch assembly 28 to fix first input shaft 40 for rotation with output member 74.

As described above, ECU 30 delivers commands to the components of powertrain system 20 based on the receipt and evaluation of various input signals. These commands may include gear ratio interchange commands to a shift control device that indirectly moves clutches 82, 84, 86, 88, 90 and 92 to establish the gear ratios between first and second input shafts 40, 42 and countershaft 44. The shift control system 26 may be a conventional device, or any other suitable device that controls the axial position of each of clutches 82, 84, 86, 88, 90 and 92.

Operation of hybrid powertrain system 20 will now be described with reference to FIG. 2. In a first mode of operation employed during vehicle launch and acceleration, first and second main clutches C1 and C2 are initially disengaged and clutch 82 is moved leftward from the neutral position shown in FIG. 2, so that 1st speed output gear 62 is fixed to countershaft 44 by clutch 82. Upon this movement, power from prime mover 22 may be transmitted to countershaft 44 by engaging second main clutch C2. The power applied to second input shaft 42 is transmitted through 1st speed input gear 58 to countershaft 44 through 1st speed output gear 62, and then to final drive pinion 73 so that a first speed ratio is established in transmission 24.

As the vehicle accelerates and the second speed ratio is desired, clutch 86 is moved rightward from the neutral position shown in FIG. 2, so that 2nd speed output gear 70 is fixed to countershaft 44 by clutch 86. The engagement of clutch 86 occurs while first main clutch C1 is disengaged and no power is being transmitted from prime mover 22 to first input shaft 40. Once clutch 86 is engaged, the currently engaged second main clutch C2 is disengaged while simultaneously or nearly simultaneously engaging first main clutch C1. The resulting power applied to first input shaft 40 is transmitted through 2nd speed input gear 48 to countershaft 44 through 2nd speed output gear 70, and then to final drive pinion 73 so that a second speed ratio is established in transmission 24. This process is repeated, including the selective activation of the appropriate clutch, in the same manner for up-shifting through the remaining gear ratios, and in a reverse manner for down-shifting from one gear ratio to another.

To achieve the reverse gear in transmission 24, first and second main clutches C1 and C2 are disengaged and clutch 86 is moved leftward from the neutral position shown in FIG. 2, so that reverse output gear 68 is fixed to countershaft 44 by clutch 86. The power applied to first input shaft 40 is transmitted from reverse input gear 52 to countershaft 44 through an idler gear 94 and reverse output gear 68, and then to final drive pinion 73.

Under a normal operating state, wherein transmission 24 assumes a certain speed gearing, both first and second main clutches C1 and C2 may be kept in their engaged conditions while one of clutches 82, 84, 86, and 88 is kept at a given power transmitting position. For example, when transmission 24 assumes the 5th speed ratio, both first and second main clutches C1 and C2 may be engaged while clutch 84 is engaged with 5th speed output gear 66 and clutches 82, 86 and 88 are in their neutral position shown in FIG. 2. Although first and second main clutches are engaged, no power is transmitted through the unselected output gears 62, 64, 68, 70 and 72 because the output gears are free to rotate on countershaft 44 when not engaged by a corresponding clutch 82, 86 or 88.

In the embodiment shown in FIG. 2, gears 58 and 62 establish a "low" gear ratio between second input shaft 42 and countershaft 44 when clutch 82 fixes gear 62 for rotation with countershaft 44. Gears 54 and 66 establish a "high" gear ratio between second input shaft 42 and countershaft 44 when clutch 84 fixes gear 66 for rotation with countershaft 44.

Figure 3:
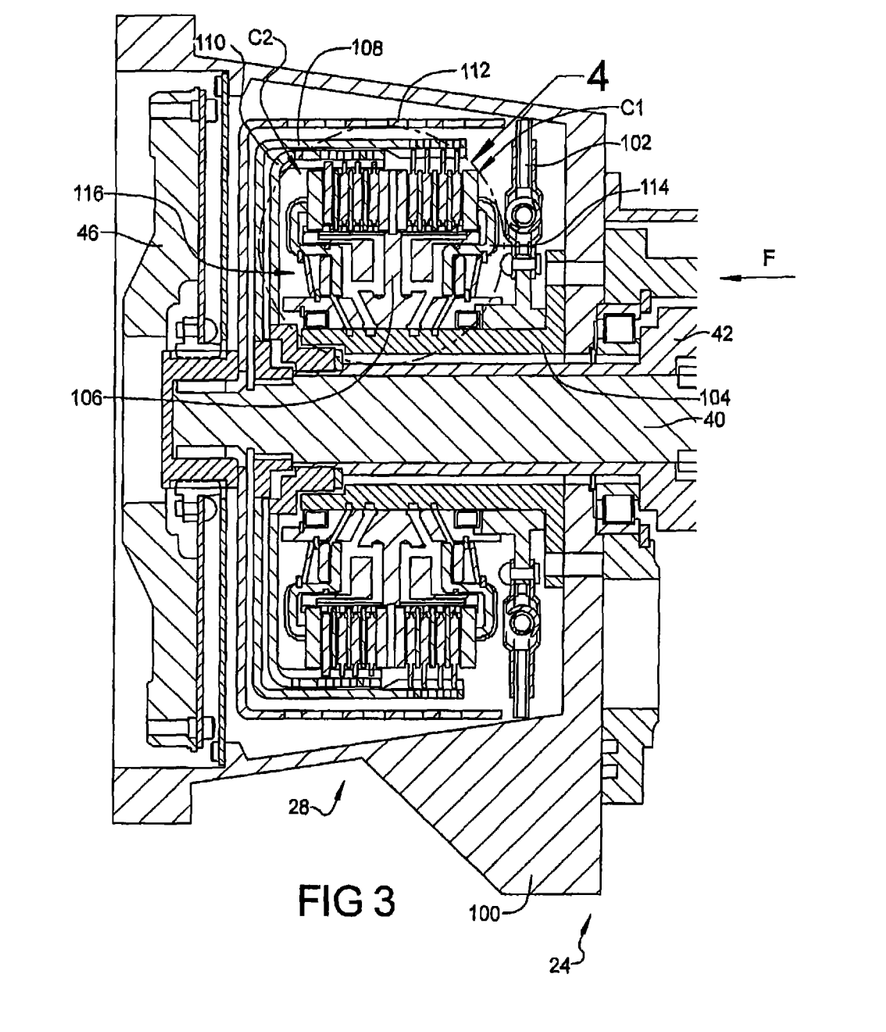
FIG. 3 is a partial sectional view of a twin clutch arrangement according to an embodiment.

As best seen in FIG. 3, the main clutch assembly 28 includes a housing 100, a damper 102, a clutch collar 104, a clutch hub 106, a first clutch drum 108, a second clutch drum 110, a main clutch drum 112, a first piston assembly 114, and a second piston assembly 116.

The housing 100 is connected to a portion of the transmission 24 and the prime mover 22. In the embodiment illustrated, the damper 102 is a lubricated noise, vibration and harshness (NVH) damper for reducing at least undesired drivetrain torque oscillations and other vibrations. The clutch hub 106 is coupled to an inner portion of the damper 102 for rotation therewith.

In the embodiment illustrated, the clutch hub 106 includes a plurality of annular first hub disks 122 and a plurality of annular second hub disks 124 extending radially therefrom. The first clutch drum 108 includes a plurality of annular first drum disks 128 extending radially therefrom. The second clutch drum 110 includes a plurality of annular second drum disks 130 extending radially therefrom. The first hub disks 122 are stacked with the first drum disks 128, and the second hub disks 124 are interleaved with the second drum disks 130, as described in greater detail below.

Figure 4:
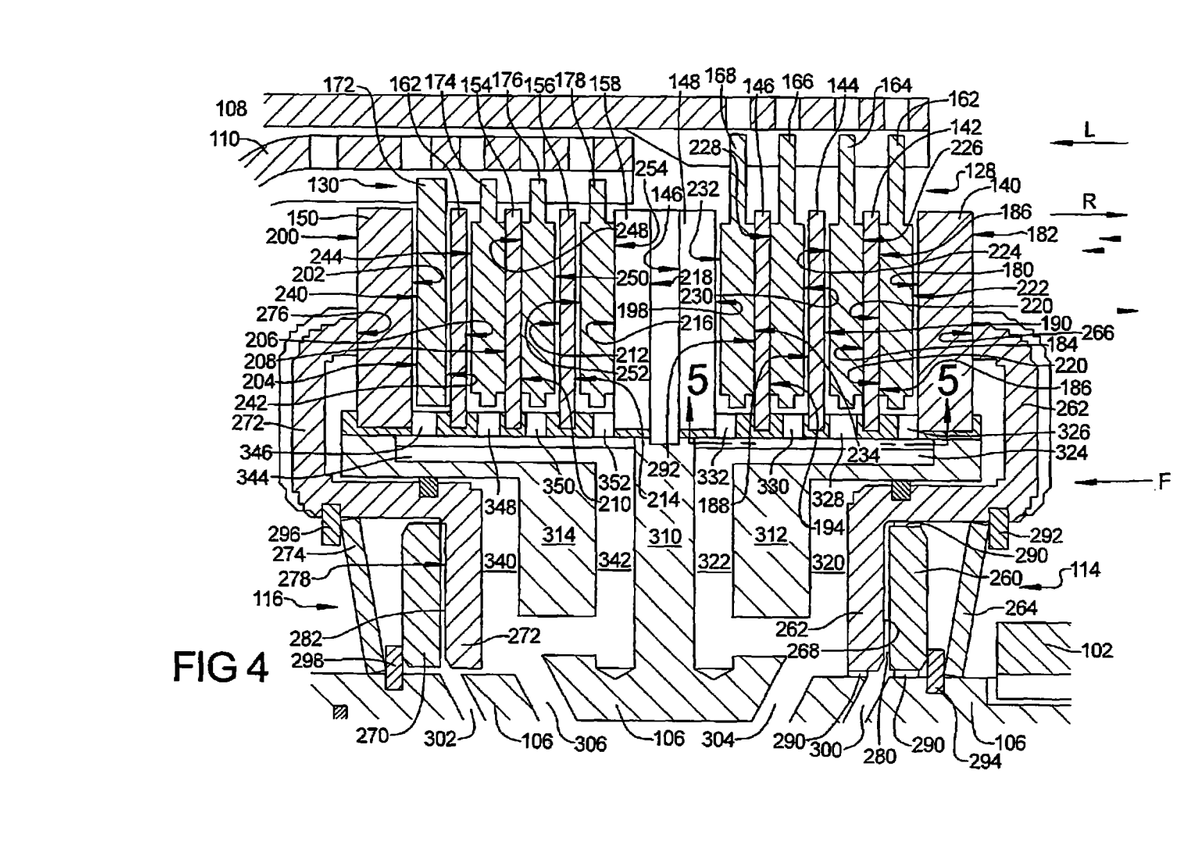
FIG. 4 is an enlarged view of portion 4 of FIG. 3.

FIG. 4 illustrates an enlarged portion of the main clutch assembly 28 of FIG. 3. As best seen in FIG. 4, the first hub disks 122 include a first pressure plate 140, a first hub first disk 142, a first hub second disk 144, a first hub third disk 146, and a first reaction plate 148. The second hub disks 124 include a second pressure plate 150, a second hub first disk 152, a second hub second disk 154, a second hub third disk 156, and a second reaction plate 158. The first drum disks 128 include a first drum first disk 162, a first drum second disk 164, a first drum third disk 166, and a first drum fourth disk 168. The second drum disks 130 include a second drum first disk 172, a second drum second disk 174, a second drum third disk 176, and a second drum fourth disk 178.

The first pressure plate 140 includes a first pressure plate forward surface 180 and a first pressure plate rearward surface 182. The first hub first disk 142 includes a first hub first disk forward surface 184 and a first hub first disk rearward surface 186. The first hub second disk 144 includes a first hub second disk forward surface 188 and a first hub second disk rearward surface 190. The first hub third disk 146 includes a first hub third disk forward surface 192 and a first hub third disk rearward surface 194. The first reaction plate 148 includes a first reaction plate forward surface 196 and a first reaction plate rearward surface 198.

The second pressure plate 150 includes a second pressure plate forward surface 200 and a second pressure plate rearward surface 202. The second hub first disk 152 includes a second hub first disk forward surface 204 and a second hub first disk rearward surface 206. The second hub second disk 154 includes a second hub second disk forward surface 208 and a second hub second disk rearward surface 210. The second hub third disk 156 includes a second hub third disk forward surface 212 and a second hub third disk rearward surface 214. The second reaction plate 158 includes a second reaction plate forward surface 216 and a second reaction plate rearward surface 218.

The first drum first disk 162 includes a first drum first disk forward surface 220 and a first drum first disk rearward surface 222. The first drum second disk 164 includes a first drum second disk forward surface 224 and a first drum second disk rearward surface 226. The first drum third disk 166 includes a first drum third disk forward surface 228 and a first drum third disk rearward surface 230. The first drum fourth disk 168 includes a first drum fourth disk forward surface 232 and a first drum fourth disk rearward surface 234.

The second drum first disk 172 includes a second drum first disk forward surface 240 and a second drum first disk rearward surface 242. The second drum second disk 174 includes a second drum second disk forward surface 244 and a second drum second disk rearward surface 246. The second drum third disk 176 includes a second drum third disk forward surface 248 and a second drum third disk rearward surface 250. The second drum fourth disk 178 includes a second drum fourth disk forward surface 252 and a second drum fourth disk rearward surface 254.

The first piston assembly 114 includes an annular first apply plate 260, an annular first piston 262, an annular first return spring 264. The first piston 262 includes a first piston reaction surface 266 and a first piston apply surface 268. The second piston assembly 116 includes an annular second apply plate 270, an annular second piston 272, an annular second return spring 274. The second piston 272 includes a second piston reaction surface 276 and a second piston apply surface 278. The clutch hub 106, the first apply plate 260 and the first piston 262 define an annular first piston chamber 280. The clutch hub 106, the second apply plate 270 and the second piston 272 define an annular second piston chamber 282. The first piston assembly 114 and the second piston assembly 116 include annular piston seals 290 for sealing the piston chambers 280, 282. In the embodiment illustrated, the first return spring 264 is axially restrained by a first piston retaining ring 292 and a first hub retaining ring 294. The second return spring 274 is axially restrained by a second piston retaining ring 296 and a second hub retaining ring 298.

The clutch collar 104 supplies fluid to the clutch hub 106, which supplies fluid to the first piston assembly 114, the second piston assembly 116, and the clutch disks as discussed in greater detail below. The clutch hub 106 includes a first piston chamber port 300, a second piston chamber port 302, a first clutch cooling port 304, and a second clutch cooling port 306. The clutch collar 104 is adapted to supply a cooling fluid (not shown) to the ports 300, 302, 304, 306 and control the pressure thereof, as is conventionally known.

The clutch hub 106 is further defined by a central web 310, an annular first balance chamber wall 312, a cylindrical first balance chamber connecting wall 314, a second balance chamber wall 316, and a cylindrical second balance chamber connecting wall 318. The first piston 262, the first balance chamber wall 312, and the first balance chamber connecting wall 314 define a first balance chamber 320. The clutch hub 106 is also defined by a first coolant passage 322, a first reservoir 324, a first cooling first inlet 326, a first cooling second inlet 328, a first cooling third inlet 330, and a first cooling fourth inlet 332. The second piston 272, the second balance chamber wall 314, and the second balance chamber connecting wall 316 define a second balance chamber 340. The clutch hub 106 is also defined by a second coolant passage 342, a second reservoir 344, a second cooling first inlet 346, a second cooling second inlet 348, a second cooling third inlet 350, and a second cooling fourth inlet 352.

As the main clutch assembly 28 rotates about the axis A-A (FIG. 3), fluid supplied through the ports 300, 302, 304, 306 will tend to rotate with the main clutch assembly 28 and will be accelerated away from the axis A-A. As fluid present within the first piston chamber 280 and the second piston chamber 282 is accelerated away from the axis A-A, the fluid will bias the respective piston 262, 272 away from the respective apply plate 260, 270 and act against the biasing force of springs 264, 274. Additionally, the fluid supplied through the ports 304, 306 will fill the balance chambers 320, 340 while excess fluid from ports 304, 306 will flow through cooing inlets 326, 328, 330, 332, 346, 348, 350, 352 and cool the clutch frictional surfaces 180, 184, 186, 188, 190, 192, 194, 196, 198, 202, 204, 206, 208, 210, 212, 214, 216, 218, 220, 222, 224, 226, 228, 230, 232, 234, 240, 242, 244, 246, 248, 250, 252, 254.

Specifically, fluid that flows through the first cooling first inlet 326 will contact and cool the surfaces 180, 220, 222, and 186. Fluid that flows through the first cooling second inlet 328 will contact and cool the surfaces 184, 190, 224 and 226. Fluid that flows through the first cooling third inlet 330 will contact and cool the surfaces 188, 194, 228 and 230. Fluid that flows through the first cooling fourth inlet 332 will contact and cool the surfaces 192, 198, 232, and 234.

When fluid pressure is supplied through the first piston chamber port 300, the first piston 262 will move in the forward direction (illustrated as the arrow F in FIGS. 3 and 4) as the first apply plate 260 remains generally stationary relative to the clutch hub 106. The first return spring 264 is axially deflected due to interference between the first piston retaining ring 292 and the first hub retaining ring 294 as the first piston 262 moves in the direction F, biasing the first piston in the direction of arrow L. As the first piston 262 moves in the direction F, the first piston will move toward the first balance chamber wall 312 and reduce the volume of the first balance chamber 320. Generally, the volume of fluid that is forced into the first piston chamber 280 is equal to the volume of fluid that is displaced from the first balance chamber, thereby maintaining the rotational weight and the rotational inertia of the main clutch assembly 28.

As fluid flows through the first coolant passage 322 and the first reservoir 324, the fluid will flow through either the first cooling first inlet 326, the first cooling second inlet 328, the first cooling third inlet 330, or the first cooling fourth inlet 332. The inventors have discovered that the contacting frictional surfaces 180, 184, 186, 188, 190, 192, 194, 196, 198, 202, 204, 206, 208, 210, 212, 214, 216, 218, 220, 222, 224, 226, 228, 230, 232, 234, 240, 242, 244, 246, 248, 250, 252, 254 of the main clutch assembly 28 may experience differing amounts of heat buildup during operation. The differing amounts of heat buildup, determined by measuring or estimating temperatures at the surfaces, may be due to the structural configurations of the disks, the materials used, and/or the amounts of cooling fluid the are directed to the surfaces. The resulting frictional forces on many frictional surfaces will vary with the temperature of the surfaces. Therefore, the efficiency of a clutch pack may degrade as the temperatures of frictional surfaces of the clutch pack vary by larger amounts. To reduce the amount of temperature variation, a greater volume of fluid is directed to the frictional surfaces that are determined to be operating at higher temperatures.

In one embodiment, the effective flow areas for fluid provided by the cooling inlets 326, 328, 330, 332 are sized to provide a desired relative flow of fluid during operation based upon measured or estimated operating temperatures of the contacting frictional surfaces. That is, for example, if the temperature of the surfaces 180, 220, 222, and 186 were determined to be greater than the remainder of the contacting frictional surfaces of the first clutch C1 by a predetermined amount, then the first cooling first inlet 326 would be enlarged to provide a larger fluid flow area than cooling inlets 328, 330, and 332. The predetermined amount may be, for example, 45 degrees Fahrenheit (25 degrees Celsius).

In another exemplary embodiment, the temperatures of at least a portion of the surfaces 180, 184, 186, 188, 190, 192, 194, 196, 198, 202, 204, 206, 208, 210, 212, 214, 216, 218, 220, 222, 224, 226, 228, 230, 232, 234, 240, 242, 244, 246, 248, 250, 252, 254 of the main clutch assembly 28 are measured during operation, and valves, or other devices are utilized to increase or decrease the amount of fluid flow through at least a portion of the inlets 326, 328, 330, 332, 346, 348, 350, and 352.

Figure 5:
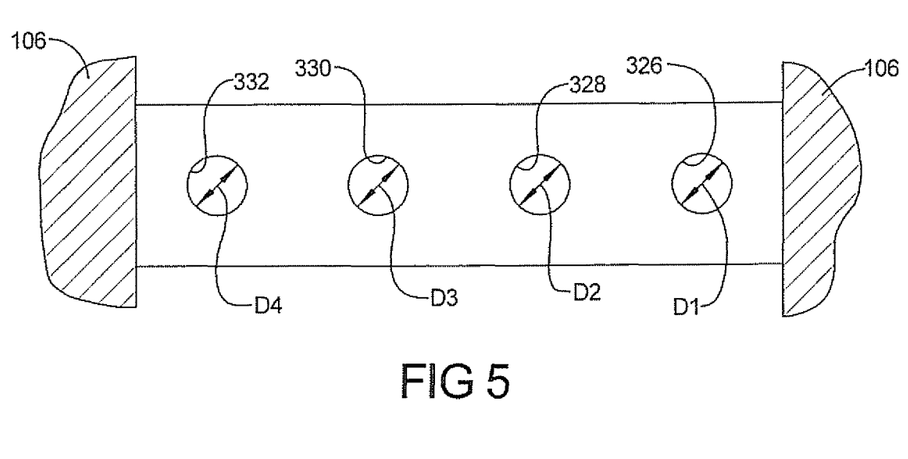
FIG. 5 is a view along line 5-5 of FIG. 4.

As best seen in the embodiment of FIG. 5, the first cooling first inlet 326 is defined by a diameter D1, the first cooling second inlet 328 is defined by a diameter D2, the first cooling third inlet 330 is defined by a diameter D3, and the first cooling fourth inlet 332 is defined by a diameter D4. The diameter D1 determines the effective fluid flow area A1 for the first cooling first inlet 326, the diameter D2 determines the effective fluid flow area A2 for the first cooling second inlet 328, the diameter D3 determines the effective fluid flow area A3 for the first cooling third inlet 330, and the diameter D4 determines the effective fluid flow area A4 for the first cooling fourth inlet 332. In the embodiment illustrated, the diameter D1 is greater than the diameter D2 and the diameter D3, and therefore the area A1 is greater than the area A2 and the area A3. Additionally, the diameter D4 is smaller than the diameter D2 and the area A4 is smaller than the area A2.

While the cooling inlets 326, 328, 330, and 332 are illustrated as having generally circular diameters, the cooling inlets 326, 328, 330, and 332 may have any geometry that affords an effective fluid flow area for fluid to pass therethrough. As best seen in FIG. 3, the flywheel 46 supplies torque to the clutch hub 106 through the damper 102. The clutch hub 106 will supply torque to either shaft 40 or shaft 42, depending upon which piston assembly 114, 116 is actuated.

Figure 6:
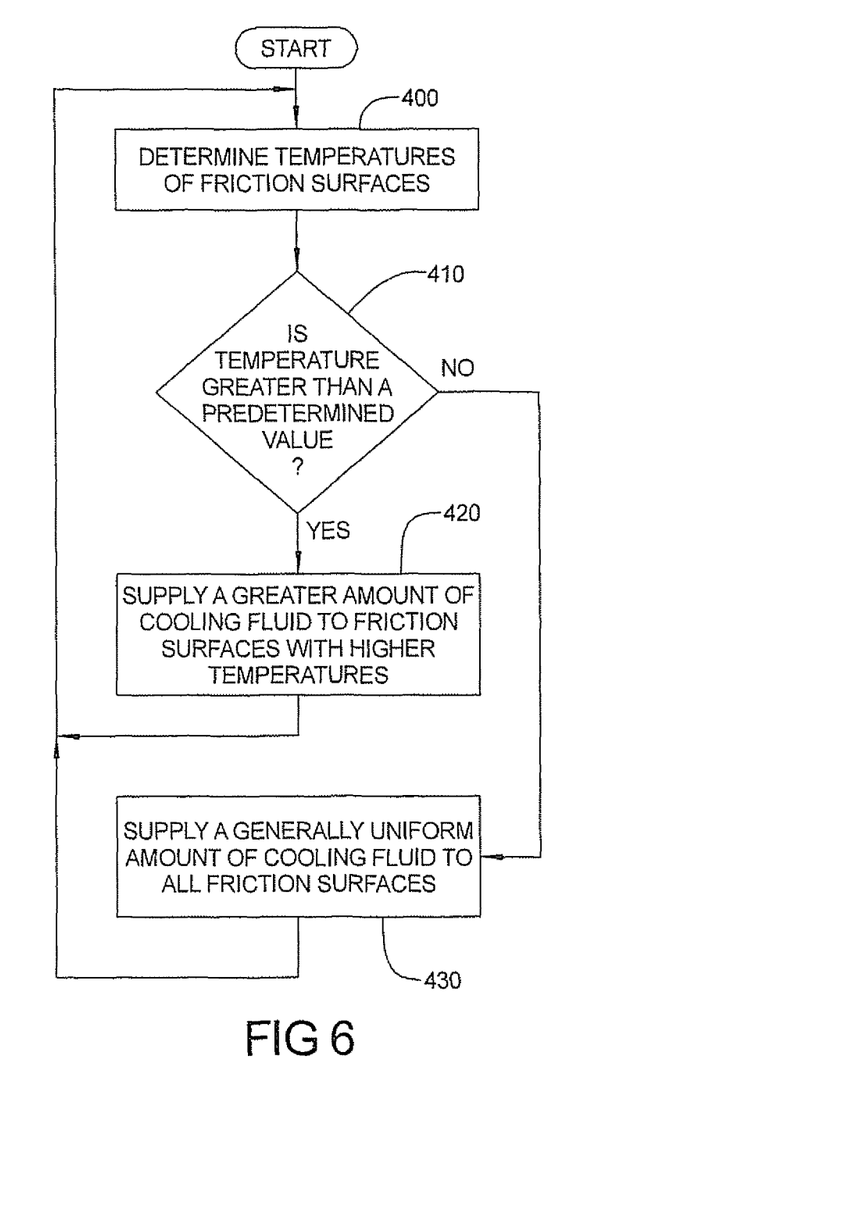
FIG. 6 is a flow chart illustrating a method of cooling the clutch of FIG. 3.

FIG. 6 illustrates a method of operating the system 20 where the effective flow areas of the cooling inlets may be varied by a valve. In step 400, temperatures of the friction surfaces of a clutch, such as the first clutch C1 are determined. In step 410, the determined temperatures are compared to determine if any temperature differences exceed a predetermined value. If the predetermined value is exceeded by the determined temperature variations, then the method proceeds to step 420. If the predetermined value is not exceeded by the determined temperature variations, then the method proceeds to step 430. In step 420, the effective area of any cooling inlet that supplies fluid to the friction surfaces experiencing the determined temperatures that exceeded the minimum measured temperature by the predetermined amount is increased. In step 430, a generally uniform amount of fluid is supplied through each cooling inlet. Accordingly, the effective flow areas may be changed during clutch operation.

In an alternative method of operating the system 20, the effective flow areas of the cooling inlets may be varied by machining the cooling inlets to differing dimensions after the clutch has been tested with temperatures of the friction surfaces determined during the testing. While this alternative method would not permit altering the cooling flow volumes through the cooling inlets during operation, the friction surfaces that experience higher operating temperatures would be cooled with a greater volume fluid flow, thereby providing a clutch pack that operates at a more uniform temperature gradient.

Although the steps of the method of cooling the system 20 are listed in a preferred order, the steps may be performed in differing orders or combined such that one operation may perform multiple steps. Furthermore, a step or steps may be initiated before another step or steps are completed, or a step or steps may be initiated and completed after initiation and before completion of (during the performance of) other steps.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A clutch apparatus comprising:
   a clutch pack having a plurality of friction disks, wherein the clutch pack will selectively transfer torque from a torque supplying member to a first torque receiving member;
   a first cooling fluid inlet having a first effective fluid flow area and located at a first axial location, wherein at least a portion of the fluid is supplied through the first cooling inlet to a first friction surface of the clutch pack; and
   a second cooling inlet having a second effective fluid flow area that is greater than the first effective fluid flow area, the second cooling inlet located at a second axial location that is different from the first axial location, wherein the fluid is supplied through the second cooling inlet to a second friction surface of the clutch pack, and wherein the second cooling fluid inlet supplies a greater volumetric flow of the fluid to the second friction surface than the volumetric flow of the first cooling inlet to the first friction surface.

2. The apparatus of claim 1, wherein the first cooling fluid inlet and the second cooling inlet are formed in a clutch hub.

3. The apparatus of claim 1, wherein the first cooling inlet directs the fluid to a first disk engaging surface of a first disk at the first axial location, and the second cooling inlet directs the fluid to a second disk engaging surface of a second disk at the second axial location.

4. The apparatus of claim 1, further comprising a first piston chamber positioned radially inward of the clutch pack, wherein the first piston chamber is operably connected to the clutch pack for exerting a compressive force on at least a portion of the clutch pack as a first fluid is pressurized into the first piston chamber.

5. The apparatus of claim 4, further comprising a first piston and a first balance chamber formed at least partially between the first piston and the torque supplying member, wherein movement of the first piston as a fluid flows into the first piston chamber will displace a second fluid from the balance chamber.

6. The apparatus of claim 1, further comprising a second clutch pack having a plurality of friction disks, wherein the second clutch pack will selectively transfer torque from the torque supplying member to a second torque receiving member.

7. The apparatus of claim 6, further comprising a second piston chamber positioned radially inward of the second clutch pack, wherein the second piston chamber is operably connected to the second clutch pack for exerting a compressive force on at least a portion of the second clutch pack.

8. The apparatus of claim 1, wherein the greater volumetric flow is directed to at least one of the cooling fluid inlets based on the temperature variations in the clutch pack.

9. A clutch apparatus for a vehicle, comprising:
   a first clutch pack having a plurality of friction disks, wherein the first clutch pack will selectively transfer torque from a torque supplying member to a first torque receiving member;
   a second clutch pack having a plurality of friction disks, wherein the second clutch pack will selectively transfer torque from the torque supplying member to a second torque receiving member;
   a first cooling fluid inlet having a first flow area and located at a first axial location, wherein at least a portion of the fluid is supplied through the first cooling inlet to a first friction surface; and
   a second cooling inlet having a second flow area that is greater than the first flow area, the second cooling inlet located at a second axial location that is different from the first axial location, wherein the fluid is supplied through the second cooling inlet to a second friction surface, and wherein the second cooling fluid inlet supplies a greater volumetric flow of the fluid to the second friction surface than the volumetric flow of the first cooling inlet to the first friction surface.

10. The apparatus of claim 9, wherein the first friction surface and the second friction surface define portions of annular disks of the second clutch pack.

11. The apparatus of claim 9, further comprising a first piston assembly including a first piston for exerting an axial force on the first clutch pack.

12. The apparatus of claim 11, further comprising a balance chamber formed at least partially between the first piston and the torque supplying member, wherein the first piston assembly defines a first piston chamber that is generally dynamically balanced by the balance chamber.

13. The apparatus of claim 9, wherein the first cooling inlet directs the fluid to a first disk engaging surface of a first disk at the first axial location, and the second cooling inlet directs the fluid to a second disk engaging surface of a second disk at the second axial location.

14. The apparatus of claim 9, wherein the first cooling fluid inlet and the second cooling inlet are formed in a clutch hub.

15. The apparatus of claim 9, further comprising a first piston chamber positioned radially inward of the clutch pack, wherein the first piston chamber is operably connected to the clutch pack for exerting a compressive force on at least a portion of the clutch pack as a first fluid is pressurized into the first piston chamber.

16. A clutch apparatus for a vehicle, comprising:
- a first clutch pack having a plurality of friction disks, wherein the first clutch pack will selectively transfer torque from a torque supplying member to a first torque receiving member;
- a second clutch pack having a plurality of friction disks, wherein the second clutch pack will selectively transfer torque from the torque supplying member to a second torque receiving member; a first cooling fluid inlet, wherein at least a portion of the fluid is supplied through the first cooling inlet to a first friction surface;
- a second cooling inlet located at an axial location of the clutch apparatus that is different from an axial location of the first cooling inlet, wherein the fluid is supplied through the second cooling inlet to a second friction surface, and wherein the second cooling fluid inlet will selectively supply a greater volumetric flow of the fluid than the volumetric flow of the first cooling inlet; and
- wherein the volumetric flow of fluid to the first cooling inlet and the second cooling inlet is controlled such that a greater volumetric flow is directed to at least one of the cooling fluid inlets based on a predetermined temperature variation that is at least one of measured and estimated for at least one of the first friction surface and the second friction surface in the clutch pack; and
- the second cooling inlet has an area that is greater than that of the first cooling inlet such that a greater amount of fluid flows through the second cooling inlet at the axial location of the second cooling inlet that is different from that of the first cooling inlet.

* * * * *